Dec. 10, 1963 R. E. BUSCH 3,113,719
CRAWL CARRY REGISTER CONTROLS
Filed Aug. 8, 1961 7 Sheets-Sheet 1

INVENTOR.
RICHARD E. BUSCH
BY
ATTORNEY

Dec. 10, 1963     R. E. BUSCH     3,113,719
CRAWL CARRY REGISTER CONTROLS
Filed Aug. 8, 1961     7 Sheets-Sheet 4

INVENTOR.
RICHARD E. BUSCH
BY
ATTORNEY

Dec. 10, 1963   R. E. BUSCH   3,113,719
CRAWL CARRY REGISTER CONTROLS
Filed Aug. 8, 1961   7 Sheets-Sheet 6

INVENTOR.
RICHARD E. BUSCH
BY
ATTORNEY

INVENTOR
RICHARD E. BUSCH

ATTORNEY

United States Patent Office 3,113,719
Patented Dec. 10, 1963

3,113,719
CRAWL CARRY REGISTER CONTROLS
Richard E. Busch, La Puente, Calif., assignor, by mesne assignments, to Addmaster Corporation, San Gabriel, Calif., a corporation of California
Filed Aug. 8, 1961, Ser. No. 130,078
12 Claims. (Cl. 235—60.31)

This invention relates to calculating machines and the like and has particular reference to accumulators of the crawl carry type wherein each denominational order includes a register gear which is driven through a differential mechanism jointly by a digitizing gear located in the same denominational order and by the register gear in the next lower order.

Such accumulators in themselves are relatively simple and reliable because of the direct geared relation between the various denominationally arranged register gears. However, heretofore totaling and subtotaling of crawl type accumulators have presented problems. These have arisen because the register gear in each order receives a fractional entry of one tenth the movement (in decimal accumulators) of the next lower order register gear, so that it is possible for a register gear to register, say, 9.99. Now, in totaling and subtotaling, the gears are driven in a subtractive direction until zero stop shoulders on or associated with the register gears engage total stops. Thus, in the case of the register gear which registers 9.99, it would have to be retracted beyond 9 increments in order to effect a proper total. However, since at the registration of 9.99, the associated zero stop would be practically at 0, the total stop would, under normal circumstances, block retraction of such register gear and an erroneous total or subtotal would result.

Heretofore, the above problem has generally been overcome by returning the various register gears or wheels to zero in sequence, starting with the register gear in the lowermost order. However, such procedure takes an appreciable period of time and requires considerable additional control mechanism.

It therefore becomes a principal object of the present invention to overcome the above noted problems.

Another object is to provide a relatively simple and reliable device for obtaining a total or subtotal from a crawl type accumulator.

Another object is to provide a crawl type accumulator in which a totaling or subtotaling operation can be accomplished in the same length of time as an entry operation takes.

Another object is to provide a crawl type accumulator and controls which are economical to manufacture and assemble.

Another object is to provide a crawl type accumulator and controls in which the majority of parts may be molded of plastic or other material.

The manner in which the above and other objects are accomplished will be readily understood on reference to the following specification when read in conjunction with the accompanying drawings, wherein.

GENERAL DESIGN

Referring to the drawings, the machine is of the ten key type wherein the digits of a value are entered sequentially through ten amount keys 11, ranging in value from zero to 9. Operation of the machine to perform entry and total or subtotal functions is controlled by two depressible control bars 109 and 1100.

Depression of an amount key sets an appropriate stop pin 12 (FIG. 2) in a pin carriage, generally indicated at 13, which shifts laterally of the machine into cooperative relation with printing sectors 14. Each of the latter carries a series of type characters 15 on its periphery, ranging from 0 to 9, the character 0 being located at the clockwisemost location relative to the rest of the series.

The printing sectors cooperate with a printing mechanism, generally indicated at 16, to print amounts registered by the sectors 14 onto a paper strip 17. The sectors also cooperate with an accumulator, generally indicated at 18, to enter amounts therein or to remove accumulated amounts during totaling and subtotaling operations.

Figure 4:
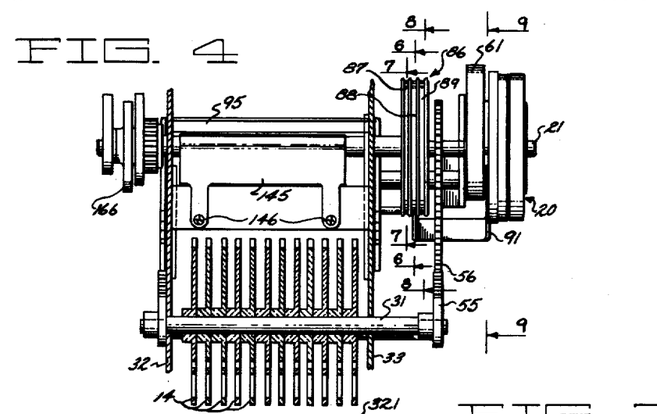
FIG. 4 is a sectional plan view taken substantially along the line 4—4 of FIG. 2.

The machine is driven by an electric motor (not shown) through a cylically operable clutch, generally indicated at 20 (FIG. 4), the clutch being effective to drive a main shaft 21 one complete revolution during each cycle of operation. The shaft carries various cams, to be described hereinafter, for driving different operating units of the machine in proper timed relation.

Keyboard

Figure 13:
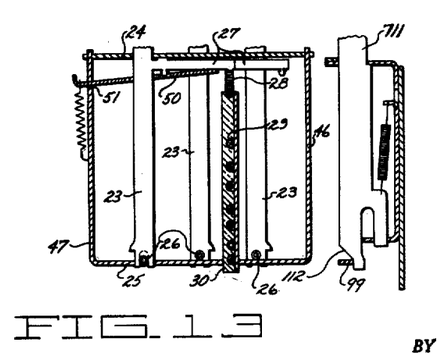
FIG. 13 is a transverse sectional view through the keyboard and is taken substantially along the line 13—13 of FIG. 2.

The amount keys 11 are mounted on key stems 23 (FIGS. 2 and 13) slideable vertically in slots provided in upper and lower key frame plates 24 and 25, respectively, the latter being suitably secured to the framework of the machine. Tension springs 26, attached at their ends to the lower frame plate 25, extend under the key stems to normally hold the amount keys in raised condition. Such springs extend across openings in the plate 25 to permit depression of the keys.

Each key stem has an extension, i.e., 27, which is attached to the upper end of a respective flexible cable 28. The various cables are vertically aligned with each other and are slideably mounted for endwise movement in grooves 29 formed in a guideblock 30 attached to the lower plate 25. The various cables terminate in an arcuate pattern concentric of a shaft 31 which is rotatably mounted in bearings formed in side frame plates 32 and 33 forming part of the machine framework (see also FIG. 4).

Pin Carriage

The pin carriage 13 is formed of an arcuate body 321 slideably mounted at its lower end on a stationary rod 331. The pin carriage has an extension 34 at its upper end which is guided along a slot 35 (FIGS. 2 and 3) formed in a channel member 36 attached adjacent its ends to frame plates 37 and 38.

The pin carriage has a plurality of vertical columns of stop pins 12 therein extending radially of the shaft 31 and slideable endwise in grooves formed in the carriage body 321. The stop pins are located in horiozntal rows aligned with the lower ends of the flexible cables 28. Thus, upon depression of a selected amount key 11, the respective cable 28 will be moved endwise to likewise move an aligned stop pin from its normal ineffective position shown in FIG. 2 to a position wherein it forms an abutment in the path of a shoulder 41 formed on each of the printing sectors 14. The pins 12 are constructed to frictionally engage the sides of their respective grooves and thereby remain in their endwise adjusted positions until returned in the latter stages of the machine cycle as an incident to return of the pin carriage.

An additional row of escapement stop pins 40 are provided. Such pins are aligned with the various vertical columns of pins and are likewise slideably mounted in grooves formed in the pin carriage body 321 for endwise movement by a finger 43 of a bail 44 which is pivoted at 45 in side frame plates 46 and 47 of the keyboard. The bail 44 is pivotally connected at 48 to a bail 50 (FIG. 13) which is fulcrummed in a slot 51 in the frame plate 47 and underlies the extensions 27 of the various amount keys.

Figure 3:
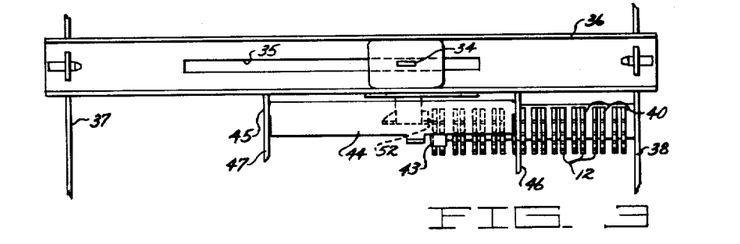
FIG. 3 is a sectional plan view illustrating part of the pin carriage and is taken along the line 3—3 of FIG. 2.

Spring means (not shown) urges the pin carriage to the left in FIG. 3, whereupon one of the escapement pins 40 abuts a shoulder 52 formed on a depending extension of the channel member 36.

Upon depression of any of the amount keys to set an appropriate stop pin 12, the bail 50 is rocked downwardly causing the finger 43 on bail 44 to depress an aligned pin 40 whereby the pin carriage may escape one column to the left.

At the completion of a machine cycle, means (not shown) returns the pin carriage to the right into its position shown in FIG. 3 wherein the left-hand column of pins therein is aligned with the ends of the cables 28. During such movement, the pins move over a stationary cam (not shown) which returns the same to their normal ineffective positions as illustrated.

Upon depression of the amount key representing the nines digit, only the pin 40 which allows the pin carriage to escape will be depressed, and the stopping of the print sector is done by a pin 211, integrally formed on the sector, which arrests against a rack comb 212 extending transversely across the machine beneath the sectors 14 and suitably mounted in side frames 32 and 33.

Printing Sector Drive

Figure 2:
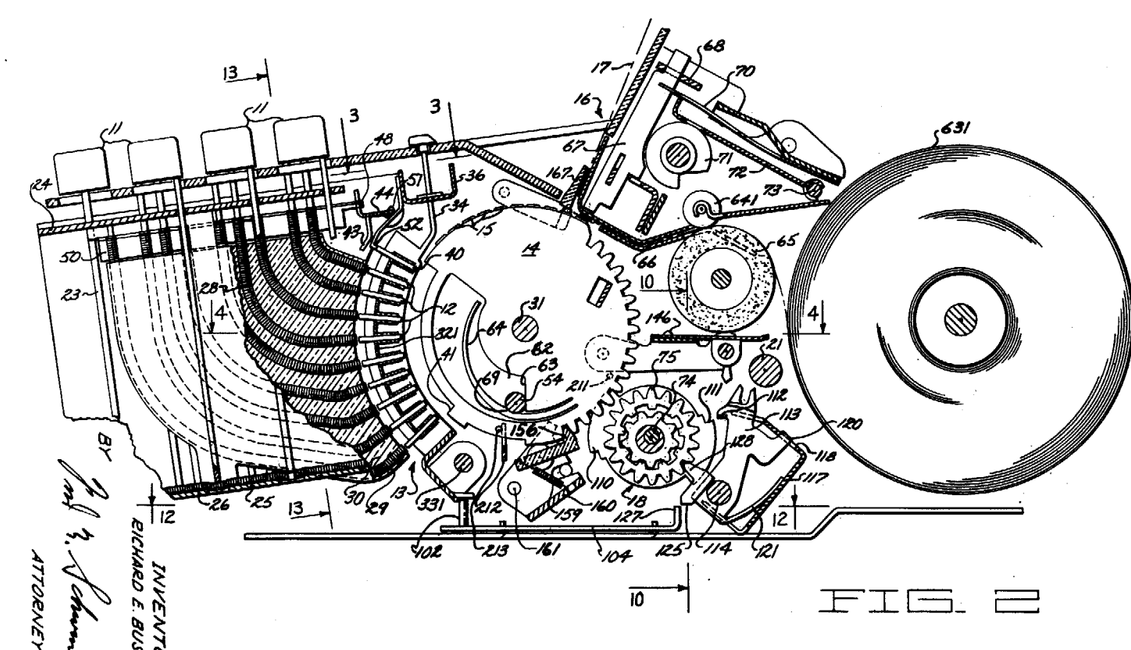
FIG. 2 is a longitudinal sectional view of the machine and is taken substantially along the line 2—2 of FIG. 1.
Figures 5, 6, 7, 8, 9:
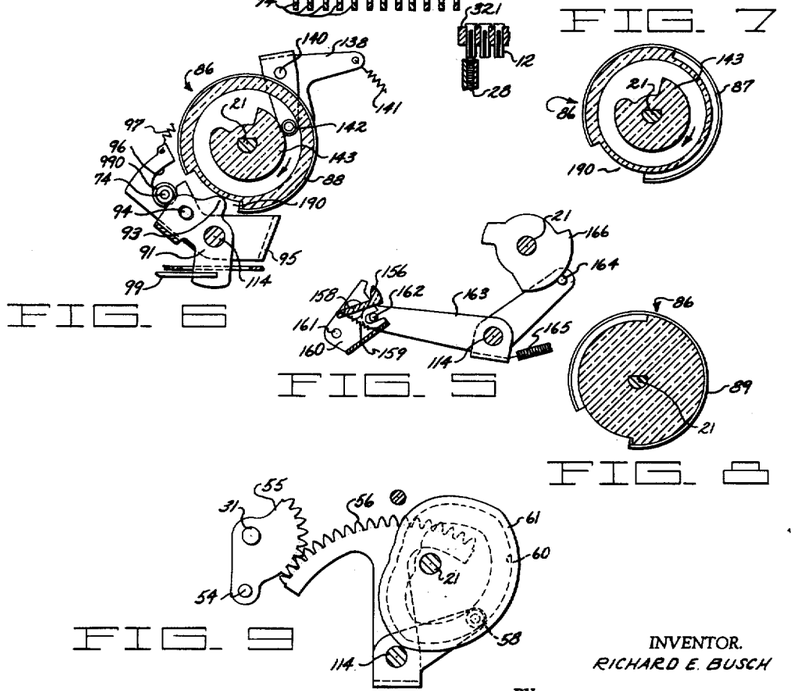
FIG. 5 is a sectional view of the aligner operating mechanism.
FIG. 6 is a sectional view taken along the line 6—6 of FIG. 4 illustrating the accumulator control cam and associated cam follower.
FIG. 7 is a sectional view through the accumulator control cam taken along the line 7—7 of FIG. 4.
FIG. 8 is another sectional view through the accumulator control cam and is taken along the line 8—8 of FIG. 4.
FIG. 9 is a sectional side view of the main sector drive mechanism and is taken substantially along the line 9—9 of FIG. 4.

The various printing sectors 14 are independently and rotatably mounted on the shaft 31 and are yieldably driven clockwise from their home positions illustrated in FIG. 2 by a bail rod 54. The latter is mounted at its opposite ends on gear sectors, one of which is shown at 55 (FIG. 9). Sector 55 meshes with a second gear sector 56 pivoted on a shaft 114 and carrying a follower roller 58 which engages a cam groove 60 formed in a cam 61 which is suitably attached to the drive shaft 21.

The bail rod 54 extends through openings 62 in the various printing sectors 14 and is normally engaged by a shoulder 69 formed on a tail 64 extending integrally with each sector.

Figures 19, 20, 21:
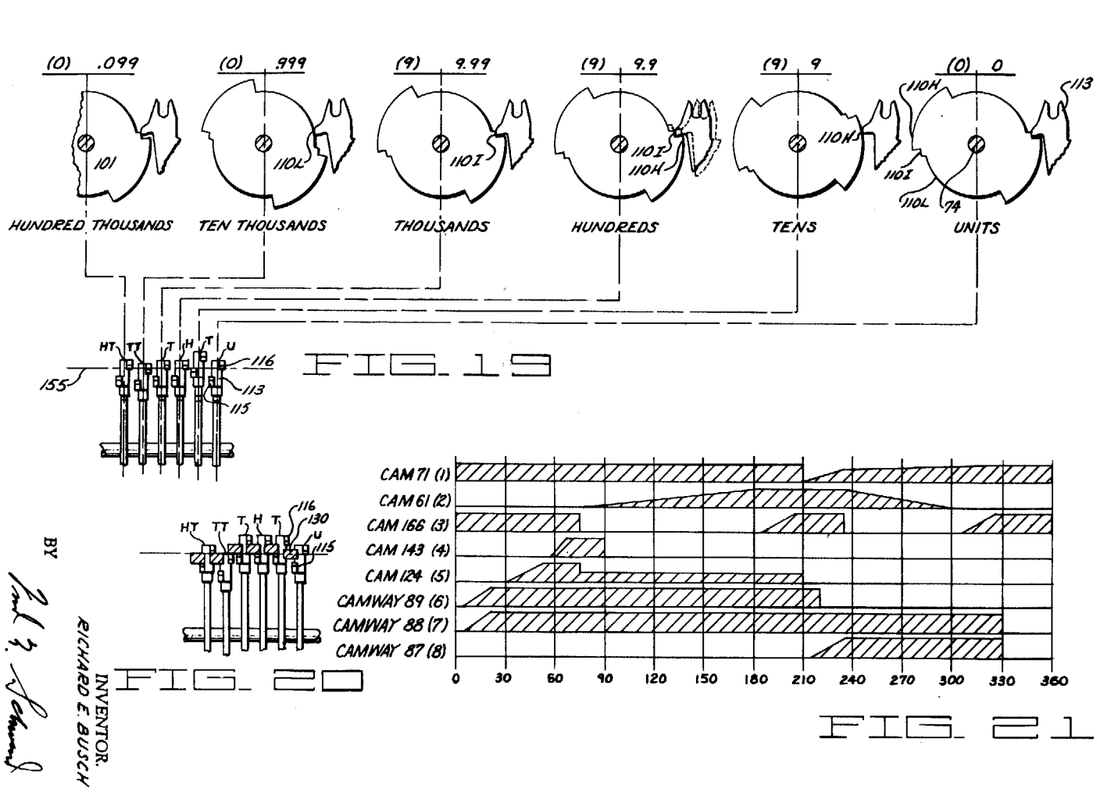
FIG. 19 is a diagrammatic view illustrating the relationship of the accumulator parts and total stop levers when registering an exemplary value.
FIG. 20 is a diagrammatic view illustrating the relationship of the total stop levers and total stop sensing wedges upon lowering of the latter into cooperative relation with the levers.
FIG. 21 illustrates a timing chart of the machine.

As seen in FIG. 21 (item 2), the bail rod 54 is rocked clockwise from its illustrated home position during a period extending from approximately 75° to 180° of the cycle. During this period, it will correspondingly rotate the sectors 14 until they strike a depressed stop pin 12 in the pin carriage during digit entry operation or until an associated accumulator gear is returned to zero during totaling and subtotaling operations, as will be described later. Thereupon, detenting shoulders 69 on the tails 64 will yield, permitting the bail rod to proceed to the limit of its excursion.

From approximately 220° to 300°, the bail rod will be returned counterclockwise to its home position. During this period, the frictional engagement between the bail rod and the tails 64 will normally first drive the sectors 14 to their home positions which, in each case, is controlled by a pin 213 integrally formed on the sector coming to rest against the sector comb 212. The stopping of the sectors by pins 213 will allow the rod, as it continues homeward, to slide along the tails 64, coming to rest behind the shoulders 63 of the respective sectors.

Printer and Paper Feed

The paper strip 17 is fed from a supply roll 631, between gripping feed rollers 641 and 65 and through a guideway 66, past a printing station located between the printing sectors 14 and respective hammers 67. From the printing station, the strip is passed upwardly behind a transparent tearoff bar 167.

The hammers 67 are suitably guided in a frame 68 for endwise movement radially of the sectors 14, toward and away from contact with the paper strip 17. Spring elements 70 urge the hammers downwardly but are normally restrained by a rotatable cam element 71 which operates through a follower bail 72 pivoted at 73.

The cam 71 is suitably entrained through gearing (not shown) with the shaft 21 and during the printing phase (FIG. 21, item 1) which occurs at approximately 210° in the machine cycle, the cam permits the springs 70 to impel the hammers 67 downwardly, thus causing an imprint of selected type characters 15 onto the strip through a suitable printing ribbon.

The above printer and associated mechanism is disclosed in detail and claimed in the copending application of H. L. Clary et al., Serial No. 140,336, filed September 25, 1961.

Accumulator

In accordance with the present invention, the accumulator is of the crawl carry type. Referring in particular to FIGS. 2 and 14 through 17, the accumulator 18 comprises an accumulator shaft 74 guided within slots 169 formed in the beforementioned frame plates 32 and 33 for movement radially of the printing sectors 14 so as to permit meshing and demeshing of digitizing gears 75, forming part of the accumulator, with respective gear tooth sections on the printing sectors 14.

Each denominational order of the accumulator comprises a register gear element 76 having a set of ten internal teeth 77 and an eccentric hub 78. The various register gears are independently rotatable on the shaft 74 and are held in proper spaced relation to each other by spring fingers 81, each formed by two spaced longitudinally extending grooves 79 formed in the respective hub 78 and each provided with a lobe 82 which rides in a respective groove 83 formed in the shaft.

A floating gear 84 having nine teeth is rotatably mounted on each hub 78. Gear 84 meshes with a set of nine internal teeth formed on the associated digitizing gear 75 and with the set of ten teeth 77 on the register gear 76 of the next higher order. Each gear 75 is rotatably mounted on an annular flange 85 formed on an adjacent register gear 76 and carries a set of eighteen external teeth thereon adapted to mesh with the gear tooth section of the associated printing sector 14.

It will thus be seen that each register gear 76 receives rotation from both its associated digitizing gear 75 and the register gear 76 in the next lower order. The relation between the gears is such that each register gear will receive one digital increment of movement from its associated digitizing gear upon movement of the latter one digital increment and one-tenth of a digital increment upon movement of the register gear in the next lower order one digital increment so that a tens carry may be effected simultaneously with digitation by the printing sectors 14 in either of opposite directions, depending on whether additive or subtractive entries are being made.

Figure 14:
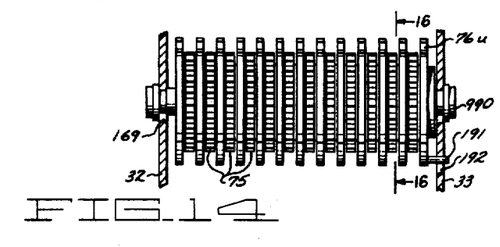
FIG. 14 is a plan view of the accumulator.
Figure 15:
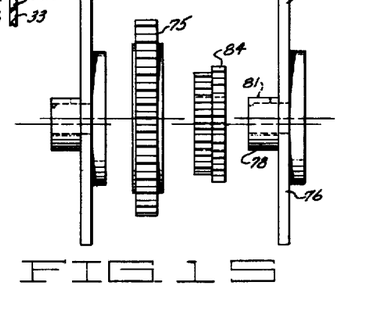
FIG. 15 is an enlarged exploded view illustrating the parts comprising one denominational order of the accumulator.
Figure 16:
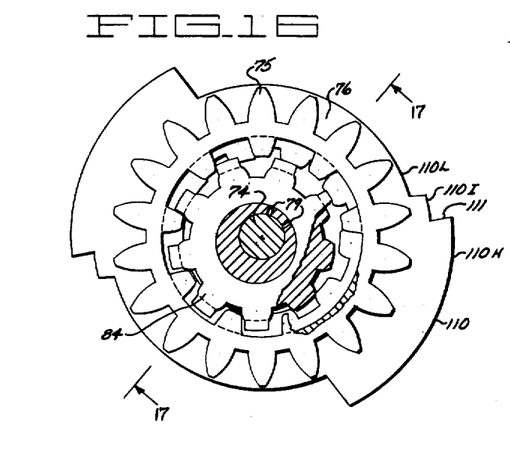
FIG. 16 is an enlarged sectional view through the accumulator and is taken substantially along the line 16—16 of FIG. 14.
Figure 17:
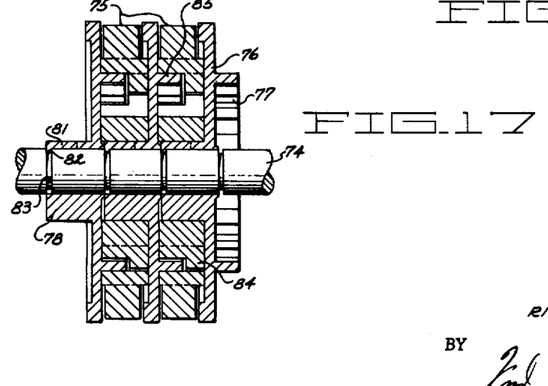
FIG. 17 is an enlarged sectional view through the accumulator and is taken along the line 17—17 of FIG. 16.

Referring to FIG. 14, it will be noted that the register gear 76u in the lowermost or units denominational order is prevented from rotating in either direction and for this purpose it is provided with a pin 191 which is embraced by a slot 192 in the frame plate 33. The slot 192 preferably extends in a direction radially of the printing sectors 14 so as to prevent rotation of the gear 76u during meshing and demeshing of the accumulator.

Accumulator Controls

The accumulator is meshed and demeshed with the printing sectors 14 at different times in a machine cycle as set forth by items 6, 7 and 8 in the timing diagram 21, depending on whether additive or subtractive entries are being made or whether totaling or subtotaling operations are being performed.

For this purpose, an accumulator control cam 86 (FIGS. 4, 6, 7 and 8) is attached to the main drive shaft 21. The cam 86 is provided with three different camways 87, 88 and 89 on its periphery, the camways being separated by broken flanges 90.

A cam follower bail 91 is mounted on stationary shaft 114 for both pivotal and longitudinal movement along the shaft. A follower nose 93 is provided to follow a selected camway. The bail 91 is connected through a pin and slot connection 94 with a camming bail 95 which is also pivoted on the shaft 114. Bail 95 is provided with spaced arms having cam grooves 96 therein which embrace rollers 990 on the opposite ends of the accumulator shaft 74. Accordingly, when the bails 91 and 95 are rocked counterclockwise by a selected camway against the action of a tension spring 97, they will cam the accumulator into mesh with the printing sectors.

It will be noted that the flanges are broken at 190 to permit lateral shifting of the follower bail 91 when the machine is in full cycle position.

Means are provided to shift the follower bail 91 into cooperative relation with any of the camways on cam 86. For this purpose, the bail 91 is engaged by a bifurcated lever 99 (FIG. 12) pivoted at 100 and urged counterclockwise by a tensioned spring 101 tending to locate the nose of the cam follower bail in engagement with the camway 87 of the control cam 86. In such case, the accumulator would be meshed with the printing sectors 14 during the return or counterclockwise rocking movements thereof as occurs during additive entry operations (see also item 8 of FIG. 21).

Now, the pin carriage carries a stud 102 (FIGS. 2 and 12) which is embraced within a slot 103 formed in a blocking plate 104. The latter is slideably mounted for fore and aft movement on a bottom frame plate 105 of the machine through pin and slot connections 106. When the pin carriage is moved into its right-hand or home position shown in FIGS. 3 and 4, the stud 102 cams the blocking plate 104 forwardly into its position shown in FIG. 12, causing an ear 107 to cam against an inclined edge 108 on the lever 99, thus moving the latter into its neutral illustrated position wherein the cam follower bail 91 is positioned in cooperative relation with the central camway 88. It will be noted on reference to FIGS. 6 and 21 (item 7) that the camway 88 has a high portion extending around the major part of its periphery, whereby to maintain the accumulator in mesh with the printing sectors during both the advance and retraction of the latter. This occurs during subtotaling operations of the accumulator.

Figure 1:
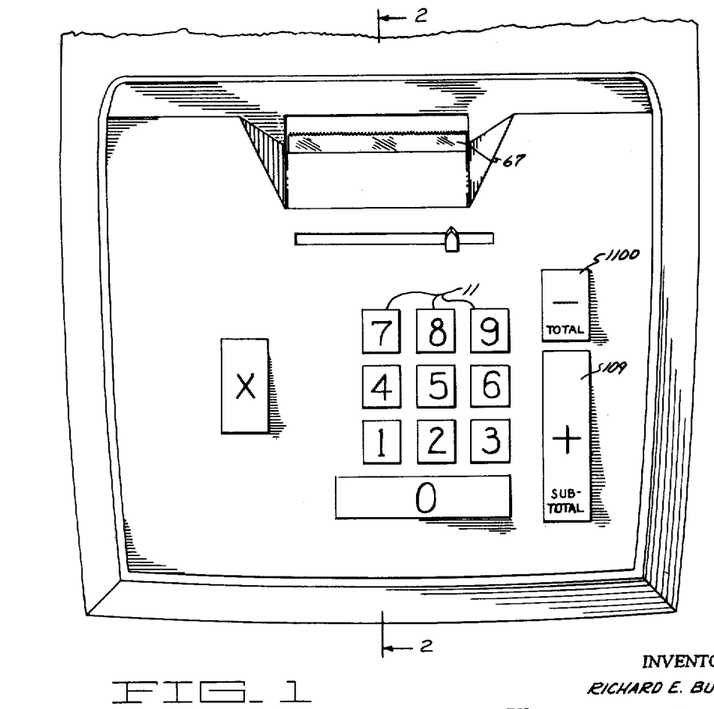
FIG. 1 is a plan view of an adding machine embodying a preferred form of the present invention.

Thus, when no amount has been entered into the pin carriage, i.e., when the pin carriage is in its home position, and the add-subtotal bar 109 (FIG. 1) is depressed to cause engagement of the clutch 20 in a suitable manner (not shown), a subtotal operation will ensue. However, when an amount has been entered into the pin carriage, i.e., when the latter is moved out of its home position, the blocking plate 104 will be cammed rearwardly of its position shown in FIG. 12, permitting the lever 99 to rock counterclockwise, thus moving the cam follower bail 91 into cooperative relation with the camway 87.

Figure 12:
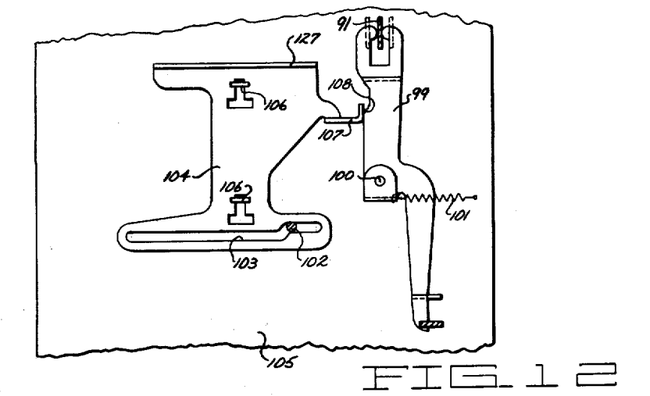
FIG. 12 is a sectional plan view taken substantially along the line 12—12 of FIG. 2 illustrating part of the accumulator controls.

Minus-total bar 1100 is mounted on a stem 711 (FIG. 13) which is suitably guided for vertical movement and has a camming edge 112 engageable with the lever 99 so that depression of the bar 1100 will cam the latter lever clockwise beyond its position shown in FIG. 12 whereby to position the cam follower bail 91 in cooperative relation with the camway 89 of the cam 86. As shown in FIGS. 8 and 21 (item 6) the camway 89 has a high portion so located as to mesh the accumulator with the printing sectors during the early portion of the cycle or during advance of the sectors 14 so as to effect a subtractive entry or totaling operation, as will be described in detail hereinafter.

Totaling and Subtotaling Controls

In accordance with the present invention, means are provided to effect a total or subtotal operation of the accumulator in the same cyclic period as in digitizing operations. For this purpose, each register gear 76 is provided with a flange 110 (FIGS. 2, 15, 16, and 22 to 25) having a broken or stepped periphery. The flange 110 is divided into two diametrically opposed high levels 110H, two diametrically opposed intermediate levels 110I and two diametrically opposed low levels 110L. A zero stop shoulder 111 is formed between each high and intermediate level.

As described heretofore, the accumulator is arranged to be totaled in a subtractive direction and is returned to zero registration during totaling operations by yieldably driving the accumulator gears through the sectors 14 until one or the other zero stop shoulder 111 on each register gear is arrested by an ear 112 on an associated total stop lever 113, the latter levers being positioned in the paths of the shoulders 111 during totaling and subtotaling operations only.

The levers 113 are independently pivoted on the stationary shaft 114 and each has two upstanding tines 115 and 116 which are spaced from each other lengthwise of the shaft 114 and also at right angles thereto. The levers are located within a totaling stop frame 117 which is also pivoted on the shaft 114. The latter frame has slots 118 which embrace tails 120 on the levers 113 to limit relative movement between the levers and the frame. The levers 113 are preferably formed of a flexible plastic material and each has a thin spring projection 121 integral therewith and engaging the frame 117 whereby to yieldably maintain the lever in its position shown in FIG. 2 relative to the frame wherein the tail 120 engages the forward edge of the associated slot 118.

Figure 18:
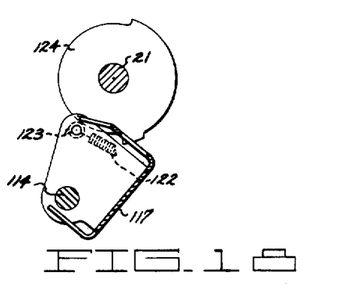
FIG. 18 is a side view of the total stop control mechanism.

The frame 117 (see also FIG. 18) is normally held in a clockwise rocked position shown by a tensioned spring 122 which maintains a stud 123 on the frame in engagement with a cam 124 secured to the drive shaft 21. In such position, the levers 113 are held out of cooperative relation with the flanges 110 as depicted in FIG. 2.

During each cycle (as indicated by item 5, FIG. 21), the cam 124 is effective to first move the frame 117 counterclockwise a sufficient amount to permit the total stop levers 113 (if they are otherwise permitted to do so) to also move counterclockwise an amount sufficient to sense any low levels 110L of register gears which might be opposite the ears 112 of the associated levers 113. Shortly thereafter, at 75°, the cam 124 allows spring 122 to return the frame 117 clockwise a partial amount sufficient to return any levers 113 which may have previously sensed the low levels of the respective register gear flanges back to a position indicated in FIG. 23 where the intermediate portions 110I may pass there beneath so as to permit the zero stop shoulders 111 to limit against the ears 112. Later, at 210°, the cam 124 allows spring 122 to fully retract the frame 117 and all levers 113 into their normal positions shown in FIG. 2.

Figure 10:
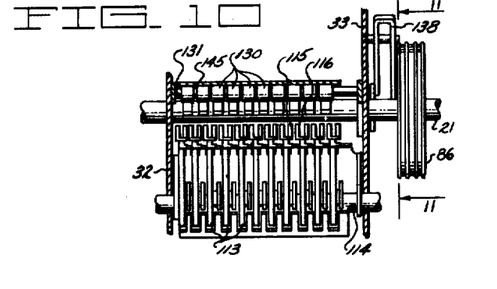
FIG. 10 is a sectional view illustrating part of the total taking mechanism of the accumulator and is taken substantially along the line 10—10 of FIG. 2.

Means are provided for retracting certain of the total stop levers 113 at the start of a digitizing operation depending on the conditions of the adjacent levers in the next lower orders. For this purpose, a series of camming or sensing wedges 130 (FIGS. 2, 10, and 22 to 25) are pivotally mounted independently of each other on a rod 131 located over the tines of the levers 113. As shown in FIGS. 10 and 20, each wedge 130 extends over the tine 116 of the lever 113 in one order and over the tine 115 of the lever in the next lower order.

Figure 11:
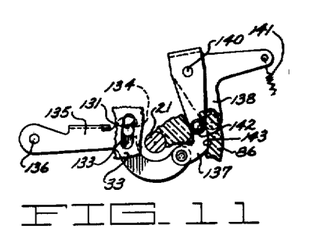
FIG. 11 is a sectional side elevation view of the linkage for actuating the total stop sensing wedges.

The rod 131 is guided at its opposite ends in vertically extending slots 133 (FIG. 11) formed in the frame plates 32 and 33. The rod 131 is also embraced by slots 134 formed in the arms of a bail 135 which is pivotally supported at 136 and is connected through a link 137 to a cam follower bail 138. The latter is fulcrumed at 140 and is urged clockwise by a tensioned spring 141 to hold a roller 142 thereon in engagement with a cam formation 143 (FIGS. 6 and 7) formed on the cam 86.

As indicated by item 4 (FIG. 21), the cam 143 is effective to cause cam follower 138 to rock clockwise, thereby lowering the wedges 130 during the period extending from 60° to 90° of the cycle.

It will be noted that the upper portions of the wedges are flattened at 144 and, when the rod 131 is held in its upper position as shown in FIG. 2, such flattened portions are engaged by a leaf spring 145 (FIGS. 2 and 4) attached at 146 to the bail 135 whereby to detent the wedges. However, upon lowering the bail 135, the spring 145 will strike the shaft 21, thereby freeing the wedges for swinging movement.

Figure 23:
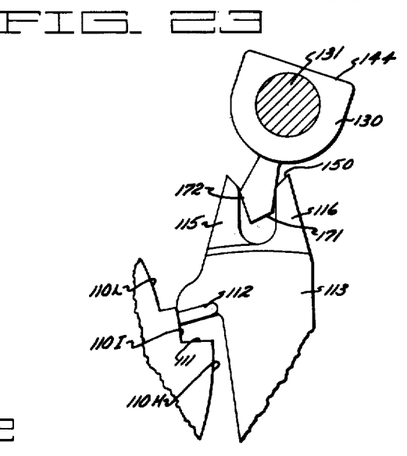
FIG. 23 is a view similar to FIG. 22 but illustrating a total stop lever and sensing wedge in a position sensing a register gear located at zero.

The following is a description of the cooperative relation between the total stop levers 113, the various register gears 76 and the camming wedges 130 during a total or subtotal operation. When all register gears register zeros, their intermediate portions 110I will be located directly under the teeth 112 of the levers 113, as indicated in FIG. 23. In such condition, if a total were attempted, the accumulator would first be moved to mesh with the sectors 14. Thereafter, the cam 124 would become effective to rock the frame 117 counterclockwise allowing the total levers 113 to sense the intermediate portions 110I of the associated register gears. Shortly thereafter, the cam 143 will lower the wedges 130. In doing so, the wedges will merely cam along the left-hand surfaces 150 of the tines 116, causing the same to rock idly clockwise into the positions shown in FIG. 23. Subsequently, the printing sectors will be actuated to drive the zero stop shoulders 111 against the ears 112. Since no appreciable movement of the register gears will take place at this time, the sectors 14 will be arrested in their normal home positions wherein the zero printing characters 15 are presented to the printing hammers.

Figure 22:
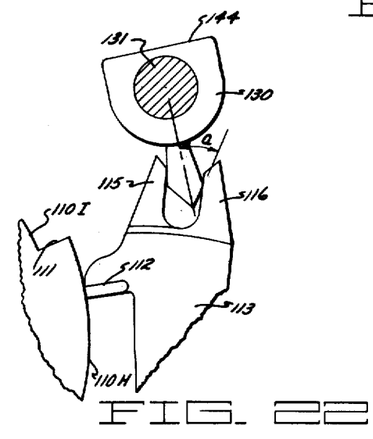
FIG. 22 is an enlarged fragmentary view illustrating a total stop and sensing wedge in a position sensing a register gear located at 9.

When a register gear registers a value other than zero, a different part of the flange 110 thereof will be presented to its stop lever 113. For example, if the gear registers an actual digital value between approximately 6 and 9.75, the high level 110H will be presented as indicated in FIG. 22, whereas if the gear registers a value between approximately .25 and 6, the low level 110L will be presented while, if the gear registers between approximately 9.75 and .25, the intermediate level 110I will be presented.

As a further example, if two adjacent orders of the accumulator register the value 09, the lower order register gear 76 will be set at 9 and the higher order gear 76 will be set at approximately 0.9 due to the transmission of nine-tenths of the setting of the lower order gear 76. This movement will be sufficient to move the intermediate level 110I of the higher order gear past the associated ear 112. Accordingly, the total stop levers will assume their positions shown in FIG. 25 when the frame 117 is rocked counterclockwise. When the wedges 130 are lowered, the wedge associated with these levers will cam counterclockwise idly along the surface 152 of the tine 115 on the lower order stop lever and also along the rear side 151 of the tine 116 on the higher order stop lever.

Prior to actuation of the printing sectors, the cam 124 will operate to retract the higher order stop lever to the level of the intermediate portion 110I of its register gear 76. Accordingly, when the sectors are actuated, the lower order register gear will be moved counterclockwise through nine increments until its zero stop shoulder 111 rests against its total stop lever. In doing so, the space between the ear 112 of the next higher order stop lever and its associated zero stop shoulder 111 will be practically closed so that the register gear in that order will not advance appreciably.

Figure 24:
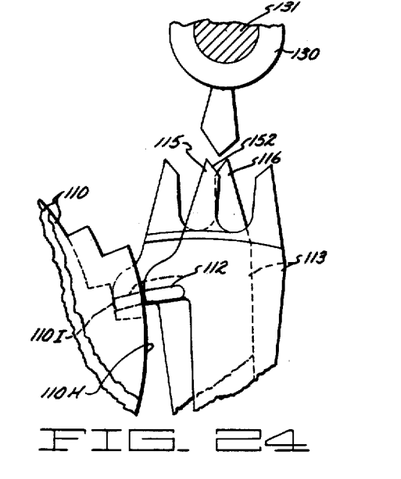
FIG. 24 is an enlarged fragmentary view illustrating the relative positions of two adjacent total stop levers when sensing respective register gears set to register the true value 99, prior to lowering of the sensing wedges.
Figure 25:
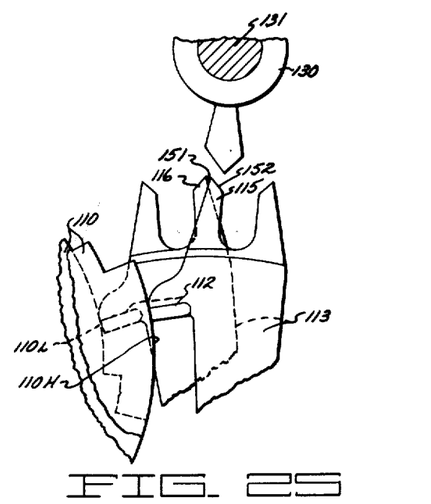
FIG. 25 is a view similar to FIG. 24 illustrating the register gears set to register the true value 09, prior to lowering of the sensing wedges.

Considering now an example where the value 99 is registered by two adjacent orders, the normal relative positions of the two register gears and their associated total stop levers prior to lowering of the wedges 130 is depicted in FIG. 24. Here, the lower order register gear presents its high level 110H to its total stop lever, but the higher order register gear which actually registers 9.9 will normally present its intermediate level 110I, although it may possibly present its high level 110H if inaccuracies are present in the entrained gears. If the condition shown in FIG. 24 prevails, subsequent lowering of the wedge 130 common to both stop levers will cause the same to cam along the surface 152 of the tine 115 of the lower order lever and thereby cam the higher order stop lever clockwise to position its ear 112 above the high level of its respective gear flange so that both gears may be driven subtractively through nine increments to zero. Any fractional carry into a next higher order register gear will be retracted during such operation.

In the next higher order, the total stop lever 113 will be raised by the action of cam 124 to an intermediate level so as to arrest its respective gear at zero.

Consider now an example where the value 009990 is registered by the accumulator and a totaling operation is to be performed. In such case, as depicted diagrammatically in FIG. 19, the flanges 110 of the various register gears 76 would be positioned as shown relative to their total stop levers 113. That is, the various register gears and their flanges 110 would actually register the underlined values indicated directly thereabove while the true or nominal registration is indicated in parenthesis.

When the total stop levers 113 are allowed to sense the flanges 110, they will assume the relative positions (viewed in plan) shown at the lower left-hand corner of FIG. 19 relative to a reference line 155. That is, the units order stop lever 113 will engage the intermediate level of the associated flange 110. The tens order stop lever will engage the outer level of its associated flange 110. In the hundreds order, the register gear and its flange will register 9.9. Accordingly, the associated stop will normally be blocked in its intermediate position shown in full lines where it will rest on the intermediate level of the flange, or it may possibly be blocked in its outermost position shown in dotted lines if inaccuracies in the gear train were present. In the thousands order, the register gear 76 and its flange 110 will stand at 9.99 or substantially 0 and therefore, its total stop lever will assume substantially the same position that the zero stop lever in the units order assumes. In the ten thousands order, although no digitation has taken place, the gear will stand at .999 or practically 1 as the result solely of tens carry from the three lower orders. Thus, the total stop lever will drop to its lowermost position. The hundred thousands order, registering .09, will present its intermediate level to its stop lever.

It will be noted at this point that the sensing wedges 130 are unsymmetrically shaped, each having a camming surface 171 which extends at a greater angle $a$ from a radial line passing through its apex than the opposite camming surface 172. This construction enables each wedge, when cammed counterclockwise by an associated total stop lever 113, to cam the next higher order total stop lever a slightly greater extent to compensate for any wear or tolerances in dimensions and yet ensure that the flange 110 associated with such higher order stop lever be properly positioned relative thereto.

Now, when the wedges 130 are lowered, as indicated in the diagrammatic plan view of FIG. 20, the units and tens order stop levers U and T, respectively, will be uneffected. The hundreds order stop lever H will be cammed back to its position illustrated if it is not already held there by its respective gear flange. The thousands order stop lever T will be cammed back by the associated wedge 130 cooperating with the stop lever H. The ten thousands order stop lever TT, which at this time senses the lower level of its respective gear flange, is allowed to remain in contact therewith. Obviously, the hundred thousands lever HT will sense the intermediate level of its associated flange and will not be moved by the associated wedge.

Means are provided for retracting the printing sectors 14 a slight amount, i.e., approximately equal to one-fourth the circular pitch of the gear teeth on the sectors, and in a counterclockwise direction when the machine is at rest as well as during the early phases of a cycle and during the printing operation. Such retraction of the sectors enables any of the lowermost stop pins 12 representing zero to be set while permitting shifting of the pin carriage without the possibility of engagement with the shoulders 41 of the sectors. Also, such setting ensures that a maximum amount of tolerance in the accumulator parts may be accepted while ensuring reliable operation thereof, particularly during totaling and subtotaling operations.

For this purpose, an aligner 156 (FIGS. 2 and 5) is provided which extends along all of the printing sectors. The aligner is pivoted at 158 on a bail 160 which is fulcrumed on a stationary rod 161 and is normally held in a counterclockwise rocked position relative to the bail 160 by a tension spring 159. The bail 160 (see also FIG. 5) is connected through a pin slot connection 162 to a cam follower 163. The latter is fulcrumed on the shaft 114 and carries a roller 164 which is held by a tentioned spring 165 against the periphery of an aligner control cam 166 secured to the drive shaft 21.

When the aligner is rocked into engagement between two adjacent teeth on the sectors 14, the bail 160 continues to rock counterclockwise slightly effecting a toggle action which retracts the sectors slightly.

As shown at item 3 (FIG. 21), the aligner 156 is normaly in engaged position and is held in position until approximately 75° in the cycle. Thus, during totaling and subtotaling operations wherein the total stop levers 113 are caused to cooperate with the register elements 76 of the accumulator, such elements are retracted slightly (see FIG. 23) so as to ensure that the proper levels of the register elements are presented to the respective stop levers 113 in spite of any inaccuracies in the accumulator parts. Just prior to the printing operation, the aligner is again moved into aligning position to align and advance the sectors to a position where they are held until after the printing operation and commencement of the sector return movement at 220°. Thus, the appropriate type characters are properly aligned with each other and with the hammers during printing.

It will be noted (FIGS. 2 and 12) that a ledge 127 on the plate 104 normally, i.e., when the pin carriage is in its home position, lies outside the paths of movement of lugs 125 on the levers 113, thus permitting the same to move into cooperative relation with the flanges 110. However, during digit entry operations, when the pin carriage is moved out of its home position, the plate 124 is moved rearwardly, thereby positioning the ledge 127 under the lugs 125 to prevent movement of the levers 113 toward cooperative relation with the flanges 110.

Additional aligner lugs 128 extend from the levels 113 to align the digitizing gears 75 when the latter are out of mesh with the sectors 14, as shown in FIGS. 2. However, when the accumulator is moved upward to mesh with the sectors, the gears 75 move out of engagement with the aligner lugs.

Various features disclosed herein are disclosed and claimed in the following copending applications: B. F. Kuhne, Serial No. 140,544, filed September 25, 1961; K. F. Oldenburg et al., Serial No. 140,547, filed September 25, 1961; K. F. Oldenburg, Serial No. 140,549, filed September 25, 1961.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a calculating machine, the combination with a register having a series of denominationally arranged register elements, digitizing gears therefor, and crawl tens transfer mechanism entrained with said gears and said register elements; and differential actuators for said digitizing gears; of totaling means for said register comprising zero stops carried by said register elements, total stops, totaling control means for effecting cooperative relation between said total stops and said register elements and for causing said actuators to drive said gears whereby to retract said register elements until said zero stops engage said total stops, means controlled by a said total stop upon cooperating with a said register element which registers more than a predetermined amount for maintaining the total stop associated with the next higher denomination register element out of cooperative relation with said last mentioned element only when said last mentioned element registers less than a predetermined amount, and means operable independently of said register elements and after said last mentioned register element is retracted a predetermined amount for rendernig said last mentioned means ineffective.

2. In a calculating machine, the combination with a register having a series of denominationally arranged register elements, digitizing gears therefor, and crawl tens transfer mechanism entrained with said gears and said register elements; and differential actuators for said digitizing gears; of totaling means comprising zero stops carried by said register elements, total stops, totaling control means for effecting cooperative relation between said total stops and said register elements and for causing said actuators to drive said gears whereby to retract said register elements until said zero stops engage said total stops, means controlled by each of said register elements for normally controlling the position of its said total stop relative to its said zero stop, means controlled by a said total stop upon cooperating with a said register element which registers more than a predetermined amount for maintaining the total stop associated with the next higher denomination register element out of cooperative relation with said last mentioned element, said last mentioned means being ineffective when said higher denomination register element registers substantially 1 or more, and means operable independently of said register elements and after said last mentioned register element is retracted a predetermined amount for rendering said last mentioned means ineffective.

3. In a calculating machine, the combination with a register having a series of denominationally arranged register elements, digitizing gears therefor, and crawl tens transfer mechanism entrained with said gears and said register elements; and differential actuators for said digitizing gears; of totaling means comprising zero stops carried by said register elements, total stops, totaling control means for effecting cooperative relation between said total stops and said register elements and for causing said actuators to drive said gears whereby to retract said register elements until said zero stops engage said total stops, means controlled by each of said register elements for normally controlling the position of its said total stop relative to its said zero stop, means controlled by a said total stop upon cooperating with a first said register element which registers more than a predetermined amount for maintaining the next higher denomination total stop associated with the next higher denomination register element out of cooperative relation with said last mentioned element, said last mentioned means being ineffective when said higher denomination register element registers more than substantially 0, and means operable independently of said register elements and after said zero stop of said higher denomination register element retracts past said higher denomination total stop for rendering said total stop maintaining means ineffective.

4. In a calculating machine, the combination with a register having a series of denominationally arranged register elements, digitizing gears therefor, and crawl tens merchanism entrained with said gears and said register elements; and differential actuators for said digitizing gears; of totaling means comprising zero stops carried by said register elements; total stops, totaling control means for effecting cooperative relation between said total stops and said register elements and for causing said actuators to drive said gears whereby to retract said register elements until said zero stops engage said total stops, sensing means controlled by a first said register element upon registering substantially 9 for rendering a second said total stop associated with a second said register element in the next higher denomination ineffective if said second register element registers substantially zero, said sensing means being ineffective if said second register element registers substantially 1 or more, and means operable independently of said register elements and after commencement of driving movement of said actuators for rendering said sensing means ineffective.

5. In a calculating machine, the combination with a register having a series of denominationally arranged register elements, digitizing gears therefor, and crawl tens transfer mechanism entrained with said gears and said register elements; and differential actuators for said digitizing gears; of totaling means comprising zero stops carried by said register elements, total stops, totaling control means for effecting cooperative relation between said total stops and said register elements and for causing said actuators to drive said gears whereby to retract said register elements until said zero stops engage said total stops, means including said total stops for sensing the values registered by respective ones of said register elements; means controlled by a said total stop upon sensing a 9 registration of its respective register element for preventing a second said total stop associated with a second said register element in the next higher denomination from engaging the zero stop carried by said second register element if said second register element registers less than substantially 1, said last mentioned means being ineffective if said second register element registers substantially 1 or greater, and means operable after said first register element is retracted a predetermined amount for placing said second total stop in a path of said second zero stop.

6. In a calculating machine, the combination with a register having a series of denominationally arranged register elements, digitizing gears therefor, and crawl tens transfer mechanism entrained with said gears and said register elements; and differential actuators for said digitizing gears; of total stop, each of said register elements having a zero stop shoulder, a high portion representing substantially 9 registration, an intermediate portion representing substantially 0 registration and a low portion representing substantially 1 registration; totaling control means for moving said total stops into engagement with said register elements and into the paths of said zero stop shoulders and for causing said actuators to drive said gears; means controlled by a said total stop upon engaging a said high portion for preventing a second said total stop associated with a second next higher denomination register element from cooperating with the zero stop shoulder on said second register element if said second total stop engages a said intermediate portion of said second register element, said last mentioned means being ineffective if said second total stop engages a low portion of said second register element.

7. In a calculating machine, the combination with a register having a series of denominationally arranged rotatable register elements, digitizing gears therefor, and crawl tens transfer mechanism entrained with said gears and said register elements; and differential actuators for said digitizing gears; of totaling means comprising zero stop shoulders carried by said register elements, total stops, totaling control means for moving said total stops into engagement with said register elements and for causing said actuators to drive said register elements toward 0 registration, said register elements each having a high portion concentric therewith and cooperable with a said total stop when the associated register element registers a predetermined amount and a low portion cooperable with said total stop when the associated register element registers substantially 0, and means controlled by a said total stop upon engaging the high portion of an associated said register element for rendering the said total stop associated with the next higher denominational register element ineffective if said higher denominational register element registers substantially 0, said last mentioned means being operable after the said zero stop shoulder of said last mentioned register element passes the associated total stop for rendering said last mentioned total stop effective.

8. In a calculating machine, the combination with a register having a series of denominationally arranged rotatable register elements, digitizing gears therefor, and crawl tens transfer mechanism entrained with said gears and said elements; and differential actuators for said digitizing gears; of total stops, each of said register elements having a high portion concentric with said register element and representing substantially 9 and a low portion representing substantially 0 and a zero stop shoulder; total control means for causing said total stops to engage said register elements and for causing said actuators to drive said register elements, sensing devices engageable with said total stops, each of said sensing devices being effective when one of said total stops engages a said high portion for withdrawing the total stop associated with the next higher denomination register element out of engagement with said last mentioned element only when said last mentioned total stop engages said low portion of said next higher register element, and means for rendering said sensing devices effective before commencement of driving movement of said actuators and for disabling said sensing devices after commencement of said driving movement of said actuators.

9. In a calculating machine, the combination with a register having a series of denominationally arranged register elements, digitizing gears therefor, and crawl tens transfer mechanism entrained with said gears and said register elements; and differential actuators for said digitizing gears; of control discs carried by said register elements, said control discs each having a high portion representing substantially 9, an intermediate portion representing substantially 0, a low portion representing substantially 1 and a zero stop shoulder intermediate said high and intermediate portions; total stops engageable with said discs, totaling control means for causing said total stops to engage said discs and for causing said actuators to drive said gears whereby to retract said register elements, and sensing devices, each of said sensing devices being controlled by a said total stop only when said last mentioned total stop engages a said high portion for withdrawing the total stop associated with the next higher denomination register element only when said last mentioned total stop engages a said intermediate portion.

10. In a calculating machine, the combination with a register having a series of denominationally arranged register elements, digitizing gears therefor, and crawl tens transfer mechanism entrained with said gears and said register elements; and differential actuators for said digitizing gears; of discs operatively associated with said register elements, said discs each having a high portion representing substantially 9, an intermediate portion representing substantially 0, a low portion representing substantially 1 and a zero stop shoulder intermediate said high and intermediate portions; total stops engageable with said discs, totaling control means for causing said total stops to engage said discs and for causing said actuators to drive said gears whereby to retract said register elements, sensing devices, each of said sensing devices being controlled by a said total stop only when said last mentioned total stop engages a high portion for withdrawing the total stop associated with the next higher denomination register element only when said last mentioned total stop engages a said intermediate portion, and means for rendering said sensing devices ineffective after a predetermined retraction of said register elements.

11. In a calculating machine, the combination with a register having a series of denominationally arranged register elements, digitizing gears therefor, and crawl tens transfer mechanism entrained with said gears and said register elements; and differential actuators for said digitizing gears; of control discs carried by said register elements, said control discs each having a high portion representing substantially 9, an intermediate portion representing substantially 0, a low portion representing substantially 1 and a zero stop shoulder intermediate said high and intermediate portion; total stops engageable with said discs, totaling control means for causing said total stops to engage said discs and for causing said actuators to drive said gears whereby to retract said register elements, sensing devices, means operable prior to retraction of said register elements for effecting cooperative relation between said sensing devices and said total stops, said sensing devices being controlled by a said total stop only when said last mentioned stop engages a said high portion for withdrawing the total stop associated with the next higher denomination register element only when said last mentioned total stop engages a said intermediate portion, and said last mentioned means removing said sensing devices from cooperative relation with said total stops after a predetermined retraction of said register elements.

12. In a calculating machine, the combination with a register having a series of denominationally arranged rotatable register elements, digitizing gears therefor, and crawl tens transfer mechanism entrained with said gears and said register elements; and differential actuators for said digitizing gears; of control discs carried by said register elements, said control discs each having a high portion concentric with the respective said register element and representing substantially the values 6 to 9, inclusive, an intermediate portion representing substantially 0, a low portion concentric with said high portion and representing approximately the values 1 to 6, inclusive, and a zero stop shoulder intermediate said high and intermediate portions; total stops engageable with said discs, totaling control means for causing said total stops to engage said discs and for causing said actuators to drive said gears whereby to retract said register elements, sensing devices, means operable prior to retraction of said register elements for effecting cooperative relation between said sensing devices and said total stops, each of said sensing devices being controlled by a respective said total stop only when said last mentioned stop engages a said high portion for withdrawing the total stop associated with the next higher denomination register element only when said last mentioned total stop engages a said intermediate portion, and said last mentioned means removing said sensing devices from cooperative relation with said total stops after a predetermined driving movement of said actuators.

References Cited in the file of this patent

UNITED STATES PATENTS

| | | |
|---|---|---|
| 2,360,615 | Mixer | Oct. 17, 1944 |
| 2,518,358 | Mixer | Aug. 8, 1950 |
| 2,549,186 | Fleming | Apr. 17, 1951 |
| 3,007,633 | Gang | Nov. 7, 1961 |

UNITED STATES PATENT OFFICE
CERTIFICATE OF CORRECTION

Patent No. 3,113,719                          December 10, 1963

Richard E. Busch

It is hereby certified that error appears in the above numbered patent requiring correction and that the said Letters Patent should read as corrected below.

Column 7, line 47, for "times" read -- tines --; lines 48 and 49, for "time", each occurrence, read -- tine --; column 11, line 59, for "merchanism" read -- transfer mechanism --; column 12, line 33, for "stop" read -- stops --.

Signed and sealed this 19th day of May 1964.

(SEAL)
Attest:
ERNEST W. SWIDER

Attesting Officer

EDWARD J. BRENNER
Commissioner of Patents